United States Patent
Kelzer

(10) Patent No.: US 6,811,364 B2
(45) Date of Patent: Nov. 2, 2004

(54) QUICK CONNECTING THREADED COUPLER

(76) Inventor: Ken Kelzer, 6026 Black Dairy Rd., Seffner, FL (US) 33584

(*) Notice: Subject to any disclaimer, the term of this patent is extended or adjusted under 35 U.S.C. 154(b) by 0 days.

(21) Appl. No.: 10/253,449

(22) Filed: Sep. 23, 2002

(65) Prior Publication Data

US 2004/0057811 A1 Mar. 25, 2004

(51) Int. Cl.[7] .............................................. F16B 35/00
(52) U.S. Cl. ........................ 411/389; 411/383; 411/395
(58) Field of Search ................................. 411/389, 383, 411/387, 395, 553, 551, 550, 418

(56) References Cited

U.S. PATENT DOCUMENTS

| | | |
|---|---|---|
| 2,430,458 A | 11/1947 | Farrell |
| 4,534,547 A | 8/1985 | Cox |
| 4,597,699 A | 7/1986 | Ramunas |
| 4,722,645 A | 2/1988 | Regan |
| 4,834,596 A | 5/1989 | Hollifield et al. |
| 5,076,748 A * | 12/1991 | Waterfield et al. .......... 411/551 |
| 5,170,560 A | 12/1992 | Allemann et al. |
| 5,372,465 A | 12/1994 | Smith |
| 5,496,137 A | 3/1996 | Ochayon et al. |
| 5,797,572 A * | 8/1998 | Schmucki et al. .......... 411/553 |
| 6,176,655 B1 | 1/2001 | Ostermeier et al. |
| 6,179,537 B1 * | 1/2001 | Anders ....................... 411/383 |
| 6,368,053 B1 * | 4/2002 | Knight, Sr. ................. 411/395 |

FOREIGN PATENT DOCUMENTS

| | | |
|---|---|---|
| DE | 38 39 738 A1 | 6/1989 |
| DE | 201 02 516 U1 | 9/2001 |
| DE | 201 12 508 U1 | 11/2001 |
| JP | 9-177805 | 7/1997 |

* cited by examiner

Primary Examiner—Frederick L. Lagman
(74) Attorney, Agent, or Firm—Merchant & Gould P.C.

(57) ABSTRACT

The invention provides a partially threaded shaft and coupler to join two objects quickly. The shaft has alternating threaded and non-threaded surfaces, and the coupler has an internal bore with alternating threaded and non-threaded surfaces. The shaft is inserted into the coupler with the threaded surfaces of the shaft aligned with the non-threaded surfaces of the coupler. The shaft or the coupler is rotated to engage the threaded sides of the shaft with the threaded sides of the coupler.

22 Claims, 4 Drawing Sheets

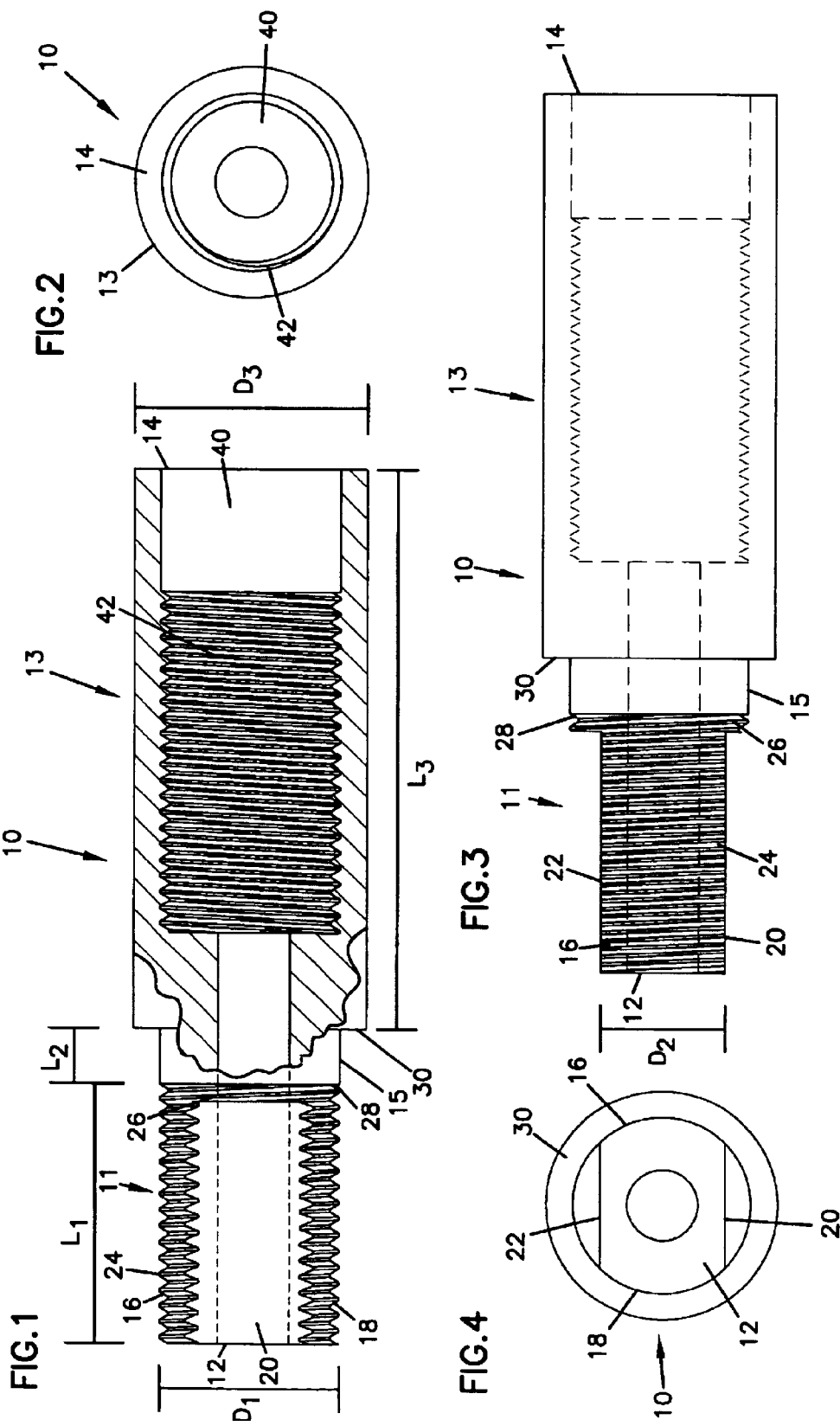

QUICK CONNECTING THREADED COUPLER

BACKGROUND OF THE INVENTION

The present invention relates to a quick connect system for applications involving two objects to be connected by threaded engagement, without requiring the numerous turnings/rotations required when the objects are fully threaded. Each of the two objects is partially threaded. The invention has application in, for example, drill bits, clamps, hose connectors, nut/bolt assemblies, mixing shafts, or any other tool system or application requiring a threaded male member to be inserted into a corresponding threaded female member, especially in situations requiring repeated engagement and disengagement of the threaded connection, such as in concrete drilling.

SUMMARY OF THE INVENTION

The invention relates to a connector assembly including a shaft and a coupler that are adapted for releasable engagement. The shaft has an external surface having alternating threaded and non-threaded surfaces. The threaded and non-threaded surfaces form a non-continuous screw thread that follows a contour of a full helical screw thread. The coupler has an internal bore with alternating threaded and non-threaded surfaces. The threaded surfaces of the coupler complement the threaded surfaces of the shaft, and the coupler is sized to fit in threaded connection with the shaft.

BRIEF DESCRIPTION OF THE DRAWINGS

FIG. 1 is a side view of a shaft according to one embodiment of the invention, shown with a cut-away region to illustrate the interior of the second end.

FIG. 2 is an end view of the second end of the shaft of FIG. 1.

FIG. 3 is a top view of the shaft of FIG. 1.

FIG. 4 is an end view of the first end of the shaft of FIG. 1.

DETAILED DESCRIPTION OF THE INVENTION

As used herein, the term "about" applies to all numeric values, whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Figure 9:
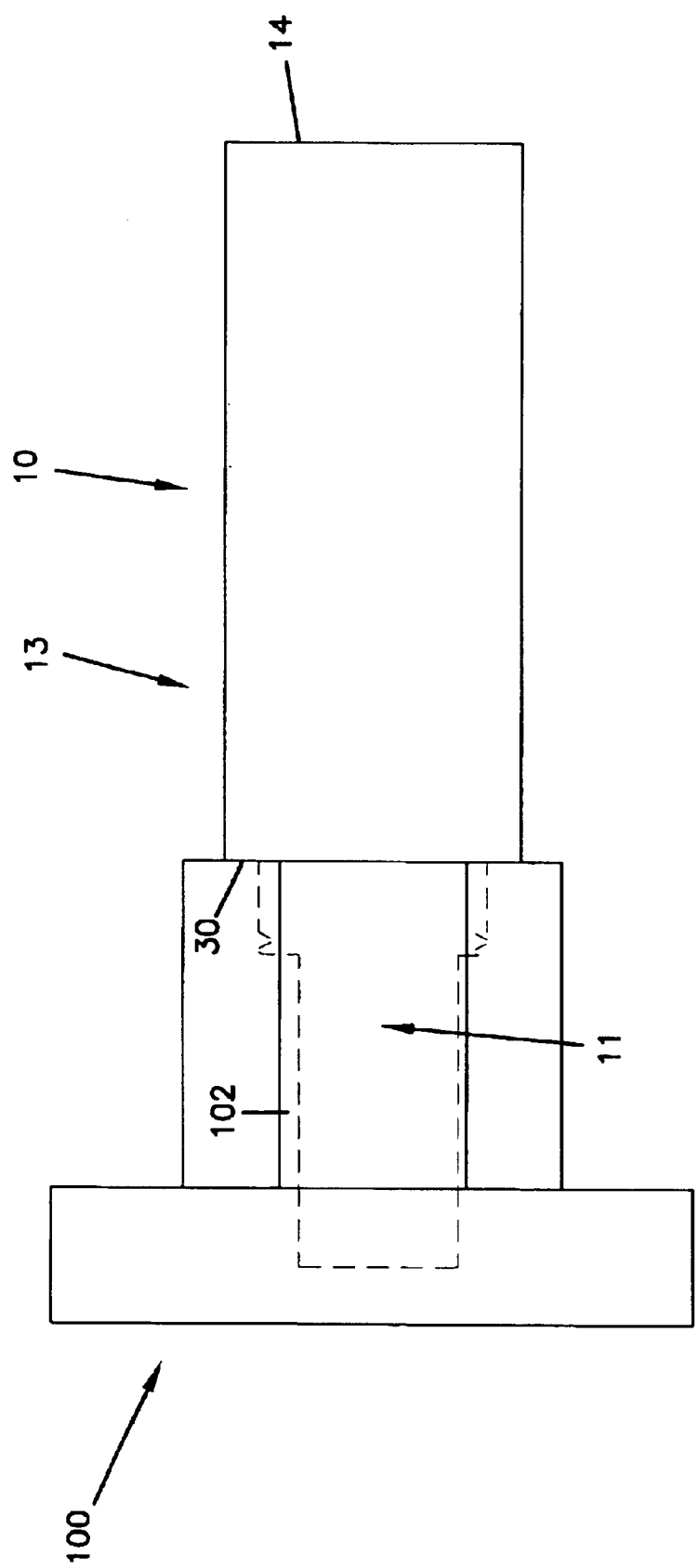
FIG. 9 is a side view of a shaft and coupler of the invention in threaded connection.

The details of the invention will be described with reference to the figures. It will be understood that the principles of the invention are applicable to any device involving a threaded connection between a shaft and coupler or any other first and second piece that are adapted for releasable, threaded engagement. The connector assembly has a shaft 10 and a coupler 100, as shown in FIG. 9. FIG. 1 illustrates a shaft 10 having a first, threaded region 11 at a first end 12 and a second region 13 at a second end 14. Second region 13 is illustrated in FIG. 1 as a non-threaded region. The threaded region 11 has threaded surfaces 16, 18 and non-threaded surfaces 20, 22 (22 being shown in FIG. 3). Threaded surfaces 16, 18 alternate with non-threaded surfaces 20, 22. The threaded and non-threaded surfaces form a non-continuous screw thread 24 that follows a contour of a full helical screw thread. The depth, spacing, angle, etc., of the threads on the shaft 10 and coupler 100 can be modified to provide the desired strength to the joined assembly. In one embodiment, the threaded surfaces are arcuate and the non-threaded surfaces are substantially planar. As used herein, "arcuate" is intended to mean a curved surface having any degree of curvature, and "substantially planar" is intended to mean a generally flat surface without substantial curvature.

Figure 5:
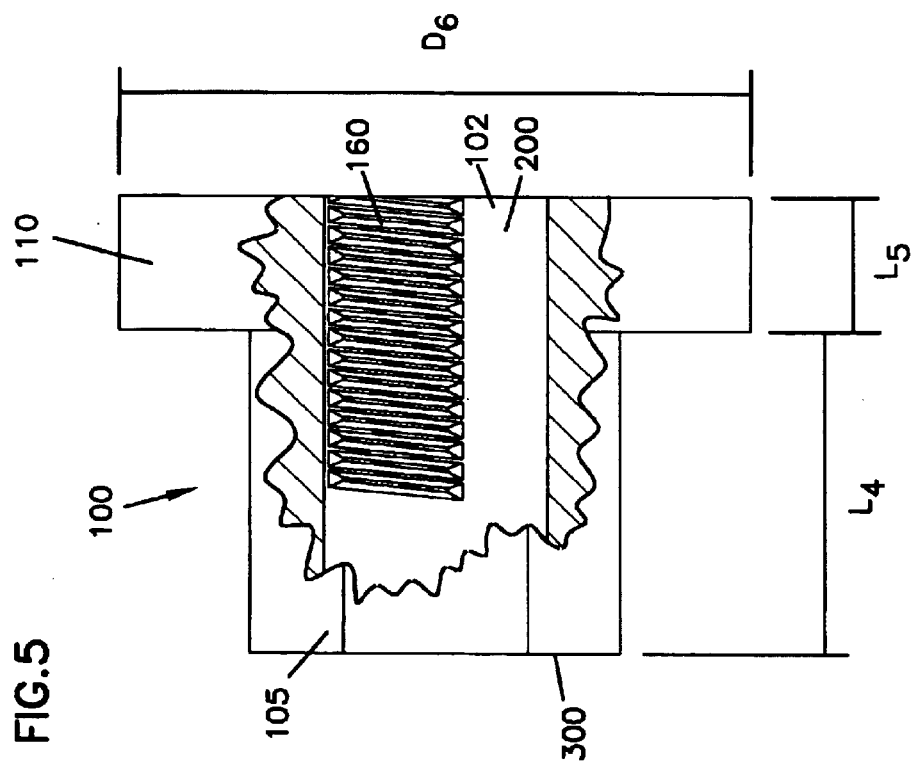
FIG. 5 is a side view of a coupler according to one embodiment of the invention, shown with a cut-away region to illustrate the interior.
Figure 6:
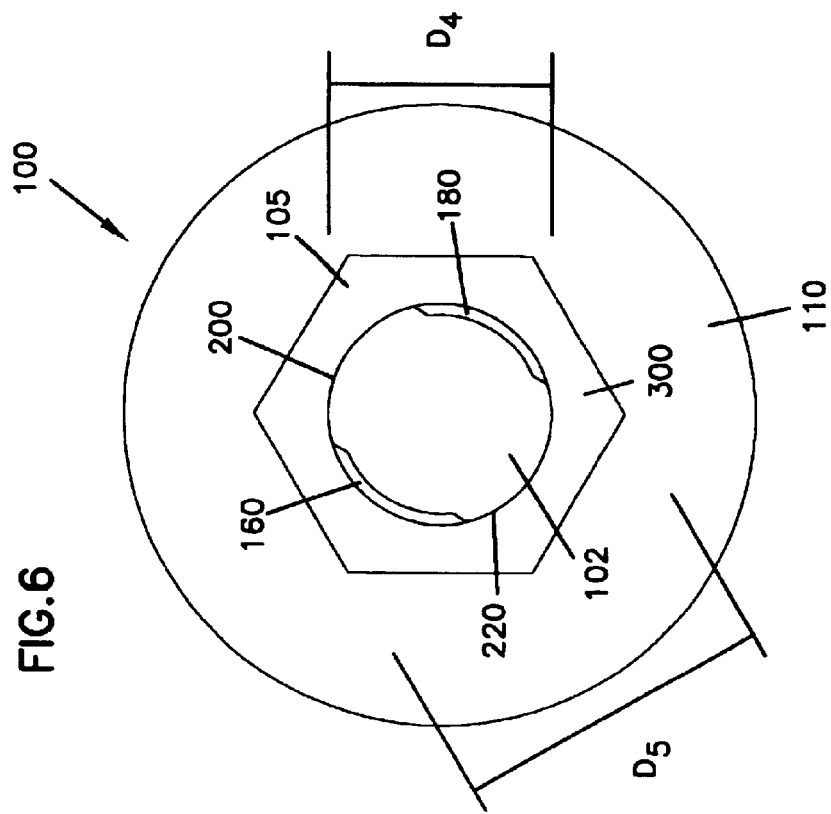
FIG. 6 is an end view of the coupler of FIG. 5.

Referring to FIGS. 5 and 6, the coupler 100 has an internal bore 102 with threaded surfaces 160, 180 and non-threaded surfaces 200, 220. Threaded surfaces 160, 180 alternate with non-threaded surfaces 200, 220. The threaded surfaces 160, 180 of the coupler 100 correspond to the threaded surfaces 16, 18 of the shaft 10. The bore 102 of the coupler 100 is shaped and sized to accept and fit, mate, or otherwise engage in threaded connection with the threaded region 11 of the shaft 10.

The shaft and coupler can have any number of threaded and non-threaded surfaces, provided each threaded surface has a corresponding non-threaded surface. In the embodiment illustrated in the figures, the shaft and coupler have two threaded and two non-threaded surfaces. A shaft with one threaded and one non-threaded surface can also have various percentages of the shaft and coupler being threaded and non-threaded. The percentage of the shaft surface that is threaded can be the same percentage of the coupler internal bore that is threaded, or the percentages of threaded surfaces can be different. For example, a shaft with ¼ of the outer surface threaded can be joined with a coupler having greater than ¼, such as ½, ¾, etc. of the internal bore surface threaded. However, the fraction of the shaft surface that is threaded plus the fraction of the coupler threaded surface should not exceed 1.

The second end 14 of the shaft 10 can be a tool, such as a drill bit, mixing shaft, or any other tool that includes a threaded connection. In an alternative embodiment, the shaft 10 is adapted to accept a tool. For example, in FIG. 1, shaft 10 has an internal threaded bore 40 at the second end 14 for connecting the shaft 10 to a tool. In one embodiment, the tool is a drill bit. The internal threaded bore 40 can have a continuous thread 42, or it can have alternating threaded and non-threaded surfaces similar to the coupler 100. Alternatively, the second end 14 can be any other suitable form of connector for joining the shaft 10 to a desired tool.

In use, the shaft 10 is inserted into the coupler 100 with the non-threaded surfaces 20, 22 of the shaft 10 aligned with the threaded surfaces 160, 180 of the coupler 100. See FIG. 7. The shaft 10 is preferably inserted the full length of the non-continuous threading 24. Once inserted, the shaft 10 is rotated to bring the shaft threaded surfaces 16, 18 into threaded contact with the coupler threaded surfaces 160, 180, thereby locking the coupler onto the shaft. See FIGS. 8 and 9.

The shaft 10 can have a restrictor 30 for limiting the insertion depth of shaft 10 into coupler 100. See FIGS. 1, 3 and 9. The restrictor 30 is dimensioned to engage a top edge 300 of the coupler 100 (FIG. 5). The restrictor 30 can be a step up to a larger diameter of the shaft, as shown in FIGS. 3 and 9. Alternatively, the restrictor can be a flange protruding from the shaft, one or more pins or other protrusions projecting outward from the shaft, or any other structure that functions to position the shaft at a desired maximum depth within the coupler.

In a variation, the non-continuous screw thread 24 of shaft 10 transitions to a continuous screw thread 26 towards a proximal end 28 of the threaded region 11 of the shaft 10. See FIGS. 1 and 3. The continuous thread 26 can provide a fine adjustment for tightening or aligning the shaft 10 with the coupler 100 and can also lock the shaft 10 in place in the coupler 100, preventing over-rotation. The continuous screw thread 26 can extend from ¾ to one or more circumferential rotations. Continuous screw thread 26 can also provide a more secure locking mechanism for joining the shaft 10 and coupler 100. This can be especially advantageous in applications involving rotation of the shaft and coupler assembly, such as in drilling or mixing, or applications involving vibration or pounding, such as in a jackhammer. As an alternative or additional safety feature, in applications involving rotation of the shaft and coupler assembly, designing the threading such that the shaft is rotated into the coupler in the opposite direction as the assembly rotates while in use can help prevent premature separation of the shaft and coupler.

The partial threading on the shaft and coupler can be designed such that the shaft fits into the coupler in only one orientation. In this embodiment, the shaft and coupler can have markings or indicators to aid the user in inserting the shaft into the coupler in the proper orientation. The markings or indicators can be painted on or etched into the shaft and coupler, they can be notches, grooves, indents, detents or any other markings or indicators that would aid the user in properly orienting the shaft and coupler.

Figure 8:
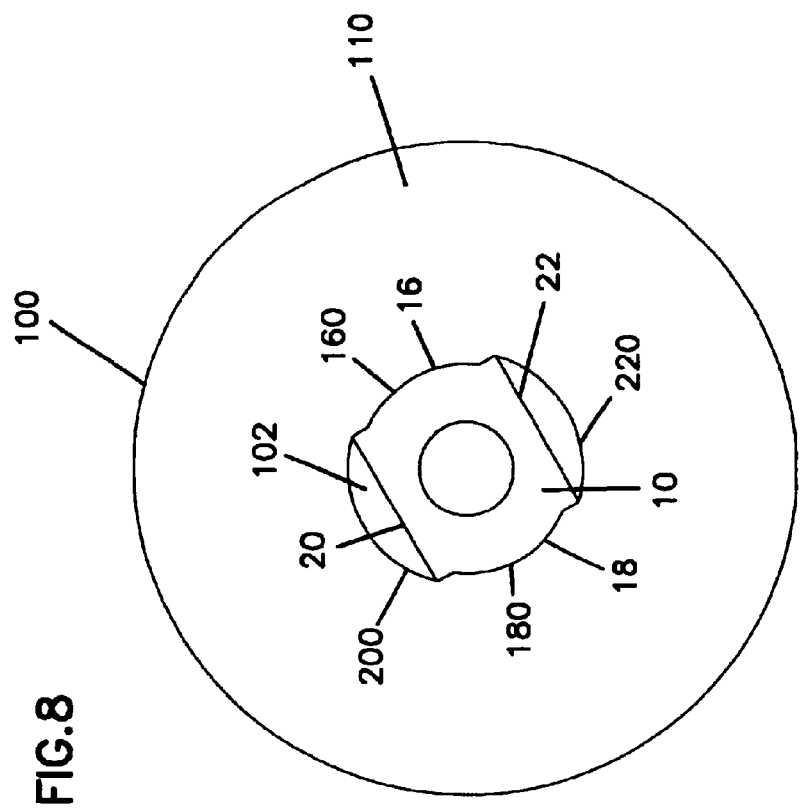
FIG. 8 shows the shaft and coupler of FIG. 7 in threaded connection.
Figure 7:
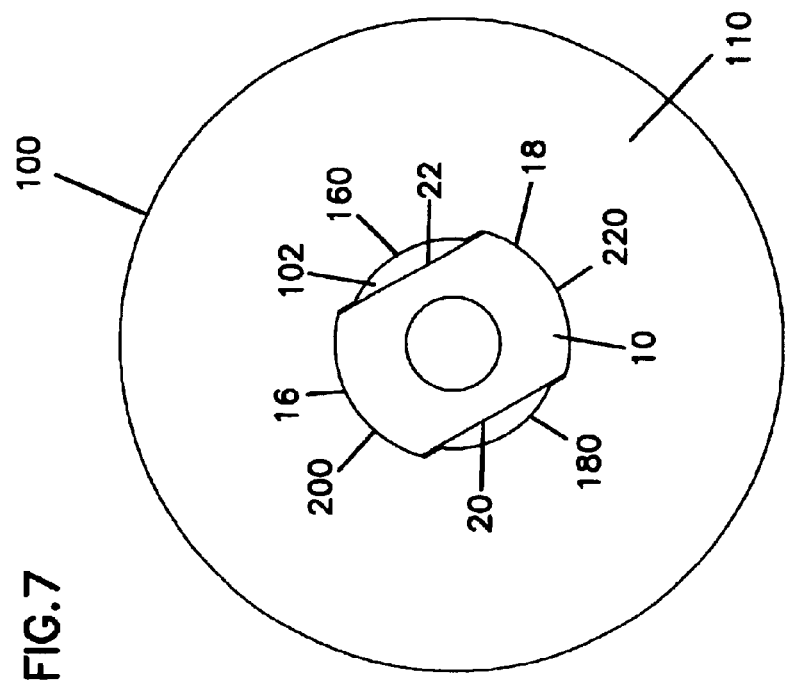
FIG. 7 is a bottom view of a shaft inserted into a coupler according to one embodiment of the invention.

The invention also includes a method of connecting a non-continuous screw threaded shaft and coupler. The method involves inserting the shaft 10 into the coupler 100, with the threaded surfaces 16, 18 of the shaft 10 aligned with the non-threaded surfaces 200, 220 of the coupler 100. FIG. 7 illustrates the shaft 10 inserted into the coupler 100. The shaft 10 moves freely into and out of the coupler 100 in this alignment. Rotation of the shaft 10 causes engagement of the threaded surfaces 16, 18 on the shaft 10 with the threaded surfaces 160, 180 on the coupler 100, as shown in FIG. 8. When the shaft 10 is rotated a partial turn in one direction, generally clockwise, the shaft 10 engages the coupler 100. Rotating the shaft 10 in the opposite direction, generally counterclockwise, disengages the shaft 10 from the coupler 100, allowing the shaft 10 to be rapidly connected and disconnected from the coupler 100.

In an alternative embodiment, the shaft remains stationary and the coupler is rotated about the shaft to bring the coupler threaded surfaces into threaded contact with the threaded surfaces of the shaft. The method involves rotating the shaft or the coupler a partial turn. The shaft and coupler are disengaged by reversing the rotation. The alignment of threaded with non-threaded surfaces allows the shaft to freely pass into and out of the coupler when the threads are not engaged. This rapid insertion and removal, combined with only a partial turn to tighten the connection provides a quick connect/disconnect between two threaded objects.

The quick connect/disconnect assembly reduces strain on the user's wrist, hands and arms caused by repeated twisting motions required for manually screwing two threaded objects together. This is especially important in situations where threaded objects are repeatedly connected and disconnected, such as attaching concrete drill bits to a drill shaft.

In the embodiment shown in the figures, the threaded region 11 of the shaft 10 has a length ($L_1$) of 1⅞ inches (FIG. 1), measures 1¹³⁄₁₆ inches between the threaded surfaces 16, 18, as indicated by $D_1$ (FIG. 1), and measures ⅞ inch between the non-threaded surfaces 20, 22, as indicated by $D_2$ (FIG. 3). The threaded surfaces 16, 18 have 13 partial threads. In the illustrated embodiment, the threaded region 11 additionally has a non-threaded area 15, extending ⅜ inch ($L_2$ in FIG. 1) from the proximal end 28 of the threading to the restrictor 30. The non-threaded region 13 is 4 inches long, as indicated by $L_3$ in FIG. 1, and has a diameter of 1⅝ inches, as indicated by $D_3$ in FIG. 1.

In the embodiment illustrated in FIGS. 5 and 6, the coupler 100 has a first region 105 with an outer hexagonal configuration, and a second region 110 with a circular configuration. As shown in FIG. 6, the internal bore 102 of the coupler has a diameter of 1⅜ inches ($D_4$). The first region 105 has a measurement of 1¹³⁄₁₆ inches ($D_5$) between opposing faces. As shown in FIG. 5, the first region 105 has a length of 1¾ inches ($L_4$). The second region 110 has a diameter of 3½ inches ($D_6$) and a length of ¾ inch ($L_5$). It will be understood that the shaft 10 and coupler 100 of the invention can have any size dimensions to suit a desired application. Additionally, the coupler 100 can have any external size and shape desired provided the internal bore 102 is sized to receive the shaft 10.

The invention has been described with reference to various specific and illustrative embodiments and techniques. However, it should be understood that many variations and modifications may be made while remaining within the spirit and scope of the invention.

What is claimed is:

1. A coupler assembly comprising:
   a) a shaft having at least one threaded surface and at least one non-threaded surface, wherein the threaded and non-threaded surfaces form a non-continuous screw thread around the shaft that follows a contour of a full helical screw thread, the shaft having first and second ends, with the non-continuous screw thread being continuous near the second end of the shaft; and
   b) a coupler having an internal bore with at least one threaded surface and at least one non-threaded surface, wherein the shaft is sized to slide into the coupler when the threaded surface of the shalt is aligned with the non-threadad surface of the coupler, and upon rotation of the shaft, the threaded surface of the shaft engages the threaded surface of the coupler.

2. The coupler assembly of claim 1, wherein the non-threaded surfaces of the shaft are substantially planar.

3. The coupler assembly of claim 1, wherein the shaft has at least two threaded surfaces and a least two non-threaded surfaces, wherein the threaded surfaces alternate with the non-threaded surfaces around the shaft.

4. The coupler assembly of claim 1, wherein the shaft has a restrictor at the second end, the restrictor preventing the shaft from sliding beyond a desired depth into the coupler.

5. The coupler assembly of claim 4, wherein the restrictor is a ridge formed by an increase in the diameter of the shaft at the second end of the shaft.

6. The coupler assembly of claim 1, wherein the second end of the shaft is adapted for connection to a tool.

7. The coupler assembly of claim 6, wherein the second end of the shaft has an internal threaded bore.

8. The coupler assembly of claim 7, wherein the internal bore has at least one threaded surface and at least one non-threaded surface forming a non-continuous screw thread.

9. The coupler assembly of claim 8, wherein the internal bore has at least two threaded and non-threaded surfaces, wherein the threaded and non-threaded surfaces alternate.

10. The coupler assembly of claim 6, wherein the second end of the shaft has external threading.

11. The coupler assembly of claim 10, wherein the second end of the shaft has at least one threaded surface and at least one non-threaded surface forming a non-continuous screw thread.

12. The coupler assembly of claim 1, wherein the non-continuous screw thread near the second end of the shaft is continuous for ¾ of a circumferential rotation.

13. The coupler assembly of claim 1, wherein the non-continuous screw thread near the second end of the shaft is continuous for a circumferential rotation.

14. A method of connecting a non-continuous screw threaded shaft and coupler, the shaft having at least one threaded surface and at least one non-threaded surface, wherein the threaded and non-threaded surfaces form a non-continuous screw thread that follows a contour of a fail helical screw thread with the non-continuous screw thread being continuous near an end of the shaft, the coupler having an internal bore with at least one threaded surface and at least one non-threaded surface, wherein the threaded surface of the coupler complements the threaded surface of the shalt; the method comprising:

a) inserting the shaft into the coupler with the non-threaded surface of the shaft aligned with the threaded surface of the coupler; and b) rotating the shaft to bring the shalt threaded surface into threaded engagement with the threaded surface of the coupler.

15. The method of claim 14, wherein in step (b) the shaft is rotated a quarter turn.

16. A coupler assembly comprising:

a) a shaft having at least one threaded surface and at least one non-threaded surface, wherein the threaded and non-threaded surfaces form a non-continuous screw thread around the shaft that follows a contour of a full helical screw thread, the shaft having fast and second ends, the second end having an internal threaded bore; and b) a coupler having an internal bore with at least one threaded surface and at least one non-threaded surface, wherein the shaft is sized to slide into the coupler when the threaded surface of the shaft is aligned with the non-threaded surface of the coupler, and upon rotation of the shaft, the threaded surface of the shaft engages the threaded surface of the coupler.

17. The coupler assembly of claim 16, wherein the internal bore has at least one threaded surface and at least one non-threaded surface forming a non-continuous screw tread.

18. The coupler assembly of claim 17, wherein the internal bore has at least two threaded and non-threaded surfaces, wherein the threaded and non-threaded surfaces alternate.

19. The coupler assembly of claim 16, wherein the non-continuous screw thread is continuous new the second end of the shaft.

20. A coupler assembly essentially consisting of:

a) a cylindrical shaft having a central axis and at least two threaded surfaces and at least two non-threaded surfaces alternatingly spaced round the central axis and each threaded surface and non-threaded surface occupying ¼ of a circumferential rotation, the wherein the threaded and non-threaded surfaces form a non-continuous screw thread wound the shaft that follows a contour of a full helical screw thread, the shaft having first and second ends; and b) a coupler having a cylindrical internal bore with at least two threaded surfaces and at least two non-threaded surfaces alternatingly spaced round the central axis and each threaded surface and non-threaded surface occupying ¼ of a circumferential rotation, wherein the shaft is sized to slide into the coupler when the threaded surfaces of the shaft are aligned with the non-threaded surfaces of the coupler, and upon rotation of the shaft, the threaded surfaces of the shaft engage the threaded surfaces of the coupler.

21. The coupler assembly of claim 20, wherein the non-threaded surfaces of the shaft are substantially planar.

22. The coupler assembly of claim 20, wherein the second end of the shaft is adapted for connection to a tool.

* * * * *

UNITED STATES PATENT AND TRADEMARK OFFICE
CERTIFICATE OF CORRECTION

PATENT NO. : 6,811,364 B2
DATED : November 2, 2004
INVENTOR(S) : Kelzer

It is certified that error appears in the above-identified patent and that said Letters Patent is hereby corrected as shown below:

Column 4,
Line 8, "measures 1 13/16 inches" should read -- measures 1 3/16 inches --
Line 57, "and a least" should read -- and at least --

Column 5,
Line 25, "contour of a fail" should read -- contour of a full --
Line 30, "surface of the shalt;" should read -- surface of the shaft; --
Line 35, "to bring the shalt" should read -- to bring the shaft --
Line 45, "shaft having fast and" should read -- shaft having first and --

Column 6,
Line 18, "continuous new" should read -- continuous near --

Signed and Sealed this

Seventeenth Day of May, 2005

JON W. DUDAS
*Director of the United States Patent and Trademark Office*